United States Patent
Wang et al.

(10) Patent No.: US 11,228,860 B2
(45) Date of Patent: Jan. 18, 2022

(54) TERMINAL POSITIONING METHOD, APPARATUS, ELECTRONIC DEVICE AND STORAGE MEDIUM

(71) Applicant: Beijing Xiaomi Mobile Software Co., Ltd., Beijing (CN)

(72) Inventors: Yanjiong Wang, Beijing (CN); Zheng Li, Beijing (CN); Shan Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/934,843

(22) Filed: Jul. 21, 2020

(65) Prior Publication Data

US 2021/0250728 A1 Aug. 12, 2021

(30) Foreign Application Priority Data

Feb. 9, 2020 (CN) .......................... 202010083293.X

(51) Int. Cl.
 *H04W 4/02* (2018.01)
 *H04W 4/029* (2018.01)
 *H04W 64/00* (2009.01)

(52) U.S. Cl.
 CPC ........... *H04W 4/023* (2013.01); *H04W 4/029* (2018.02); *H04W 64/006* (2013.01)

(58) Field of Classification Search
 CPC ......... H04W 4/38; H04W 4/029; H04W 4/02; H04W 4/023; H04W 4/80; H04W 84/12;
 (Continued)

(56) References Cited

U.S. PATENT DOCUMENTS

| 10,015,769 B1 | 7/2018 | Younis |
| 2013/0088334 A1* | 4/2013 | Chen ..................... G01S 5/0284 340/10.1 |

(Continued)

FOREIGN PATENT DOCUMENTS

| CN | 103096443 A | 5/2013 |
| CN | 103974196 A | 8/2014 |

(Continued)

OTHER PUBLICATIONS

Combined Chinese Office Action and Search Report dated Jan. 26, 2021 in Chinese Patent Application No. 202010083293.X (with English translation of Categories of Cited Documents), citing documents AL-AS therein, 7 pages.

(Continued)

*Primary Examiner* — Kwasi Karikari
(74) *Attorney, Agent, or Firm* — Oblon, McClelland, Maier & Neustadt, L.L.P.

(57) ABSTRACT

The present disclosure relates to a terminal positioning method, apparatus, electronic device, and storage medium. The method can be applied to at least one spatial reference device in a space where a terminal is located. At least two subspaces can be included in the space where the terminal is located that are respectively provided with at least one position sensing device. Further, the spatial reference device is a device that satisfies a preset position condition among the position sensing devices. The method can include performing a first communication interaction with a terminal to be located based on a first communication protocol, determining a first relative positioning result for positioning the terminal based on a result of the first communication interaction, and determining a target subspace where the terminal is located based on the first relative positioning result.

20 Claims, 6 Drawing Sheets

(58) Field of Classification Search
CPC ....... H04W 84/18; H04W 64/00; H04W 4/14; H04W 8/005; H04W 24/10; H04W 40/246; H04W 40/248; H04W 4/027; H04W 52/0209; H04W 56/0015; H04W 64/003; H04W 88/02; H04W 12/009; H04W 28/0226; H04W 28/0231; H04W 40/20; H04W 4/025; H04W 56/00

See application file for complete search history.

(56) References Cited

U.S. PATENT DOCUMENTS

| | | | | |
|---|---|---|---|---|
| 2013/0099896 | A1* | 4/2013 | Arkko | H04W 4/185 340/10.1 |
| 2016/0242005 | A1* | 8/2016 | Chen | H04W 64/00 |
| 2017/0127241 | A1* | 5/2017 | Sjolund | H04W 4/33 |

FOREIGN PATENT DOCUMENTS

| | | |
|---|---|---|
| CN | 104198989 A | 12/2014 |
| CN | 106772232 A | 5/2017 |
| CN | 106879066 A | 6/2017 |
| CN | 107566975 A | 1/2018 |
| CN | 107884748 A | 4/2018 |
| CN | 107959919 A | 4/2018 |
| CN | 108234256 A | 6/2018 |
| CN | 109996177 A | 7/2019 |
| CN | 110198521 A | 9/2019 |
| CN | 110493711 A | 11/2019 |
| EP | 3 337 195 A1 | 6/2018 |

OTHER PUBLICATIONS

Extended European Search Report dated Feb. 8, 2021 in European Patent Application No. 20191117.9, citing documents AA, AT and AU therein, 8 pages.

Combined Chinese Office Action and Search Report dated May 8, 2021 in Patent Application No. 202010083293.X (with English language translation), citing documents AO-AQ therein, 5 pages.

* cited by examiner

TERMINAL POSITIONING METHOD, APPARATUS, ELECTRONIC DEVICE AND STORAGE MEDIUM

The present application is based on and claims the priority to the Chinese Patent Application No. 202010083293.X, filed on Feb. 9, 2020, the entire contents of which are hereby incorporated by reference.

TECHNICAL FIELD

The present disclosure relates to the technical field of mobile terminals, and in particular, to a terminal positioning method, apparatus, electronic device, and storage medium.

BACKGROUND

Terminals, such as mobile phones, watches, or bracelets can be positioned through a Global Positioning System (GPS). The GPS has advantages of high positioning accuracy and wide coverage. However, as for positioning of indoor space, the received signal is extremely weak due to factors such as occlusion of a building, resulting in low positioning accuracy which cannot meet the user's indoor positioning requirements for the terminal. As a result, the user's effective management of the terminal can be diminished.

SUMMARY

Embodiments of the present disclosure provide a terminal positioning method, apparatus, electronic device, and storage medium. According to a first aspect of the present disclosure, there is provided a terminal positioning method that is applied to at least one spatial reference device in a space where a terminal is located. Further, at least two subspaces included in the space where the terminal is located are respectively provided with at least one position sensing device. The spatial reference device can be a device that satisfies a preset position condition among the position sensing devices. The method can include performing a first communication interaction with a terminal to be located based on a first communication protocol, determining a first relative positioning result for positioning the terminal based on a result of the first communication interaction, and determining a target subspace where the terminal is located based on the first relative positioning result.

According to a second aspect of the present disclosure, there is provided a terminal positioning method, wherein the method is applied to at least one position sensing device in a space where a terminal is located. At least two subspaces included in the space where the terminal is located are respectively provided with at least one position sensing device. The method can include receiving a notification sent from a spatial reference device, wherein the spatial reference device is a device that satisfies a preset position condition among the position sensing devices and the notification is used to notify the position sensing device in a target subspace where the terminal is located, and performing a second communication interaction with the terminal in response to the notification, to locate the terminal.

According to a third aspect of the present disclosure, there is provided a terminal positioning method that can be applied to a terminal to be located. The method can include performing a first communication interaction with at least one spatial reference device in a space where the terminal is located based on a first communication protocol. At least two subspaces included in the space where the terminal is located are respectively provided with at least one position sensing device, and the spatial reference device is a device that satisfies a preset position condition among the at least one position sensing device. Further, the method can include performing a second communication interaction with at least one position sensing device in a target subspace where the terminal is located, to locate the at least one position sensing device, wherein the subspace where the terminal is located is acquired by positioning the terminal through the at least one spatial reference device based on a result of the first communication interaction.

According to a fourth aspect of the present disclosure, there is provided a terminal positioning apparatus that can be applied to at least one spatial reference device in a space where a terminal is located. At least two subspaces included in the space where the terminal is located are respectively provided with at least one position sensing device, and the spatial reference device is a device that satisfies a preset position condition among the position sensing devices. The apparatus can include a first communication interaction module that is configured to perform a first communication interaction with a terminal to be located based on a first communication protocol. The apparatus can further include a first relative positioning module that is configured to determine a first relative positioning result for positioning the terminal based on a result of the first communication interaction, and a located space determining module that is configured to determine a target subspace where the terminal is located based on the first relative positioning result.

According to a fifth aspect of the present disclosure, there is provided a terminal positioning apparatus that is applied to at least one position sensing device in a space where a terminal is located. At least two subspaces included in the space where the terminal is located are respectively provided with at least one position sensing device. The apparatus can include a notification receiving module that is configured to receive a notification sent from a spatial reference device. The spatial reference device is a device that satisfies a preset position condition among the position sensing devices and the notification is used to notify the position sensing device in a target subspace where the terminal is located. The apparatus can also include a terminal positioning module that is configured to perform a second communication interaction with the terminal in response to the notification, in order to locate the terminal.

According to a sixth aspect of the present disclosure, there is provided a terminal positioning apparatus that is applied to a terminal to be located. The apparatus can include first interaction module that is configured to perform a first communication interaction with at least one spatial reference device in a space where the terminal is located based on a first communication protocol. At least two subspaces included in the space where the terminal is located are respectively provided with at least one position sensing device, and the spatial reference device is a device that satisfies a preset position condition among the at least one position sensing device. The apparatus can further include a second interaction module that is configured to perform a second communication interaction with at least one position sensing device in a target subspace where the terminal is located, to locate the at least one position sensing device. The subspace where the terminal is located is acquired by positioning the terminal through the at least one spatial reference device based on a result of the first communication interaction.

According to a seventh aspect of the present disclosure, there is provided an electronic device, wherein the electronic device is at least one spatial reference device in a space where a terminal is located. At least two subspaces included in the space where the terminal is located are respectively provided with at least one position sensing device, and the spatial reference device is a device that satisfies a preset position condition among the position sensing devices. The electronic device can include a processor and a memory for storing instructions executable by the processor. The processor can be configured to perform a first communication interaction with a terminal to be located based on a first communication protocol, determine a first relative positioning result for positioning the terminal based on a result of the first communication interaction, and determine a target subspace where the terminal is located based on the first relative positioning result.

According to an eighth aspect of the present disclosure, there is provided an electronic device, wherein the electronic device is at least one position sensing device in a space where a terminal is located. At least two subspaces included in the space where the terminal is located are respectively provided with at least one position sensing device. The electronic device can include a processor and a memory for storing instructions executable by the processor. The processor can be configured to receive a notification sent from a spatial reference device, wherein the spatial reference device is a device that satisfies a preset position condition among the electronic devices, and the notification is used to notify the electronic device in a target subspace where the terminal is located. The processor can be further configures to perform a second communication interaction with the terminal in response to the notification, to locate the terminal.

According to a ninth aspect of the present disclosure, there is provided an electronic device, including a processor, and a memory for storing instructions executable by the processor. The processor can be configured to perform a first communication interaction with at least one spatial reference device in a space where the electronic device is located based on a first communication protocol. At least two subspaces included in the space where the electronic device is located are respectively provided with at least one position sensing device, and the spatial reference device is a device that satisfies a preset position condition among the at least one position sensing device. The processor can further be configured to perform a second communication interaction with at least one position sensing device in a target subspace where the electronic device is located, to locate the at least one position sensing device. The subspace where the electronic device is located is acquired by positioning the electronic device through the at least one spatial reference device based on a result of the first communication interaction.

According to a tenth aspect of the present disclosure, there is provided a computer-readable storage medium, having computer programs stored thereon. The program is configured to implement the terminal positioning method according to the first aspect, or the second aspect, or the third aspect when executed by a processor.

According to a eleventh aspect of the present disclosure, there is provided a terminal positioning system, including a terminal, at least one position sensing device and at least one spatial reference device, wherein a space where the terminal is located includes at least two subspaces. Each subspace includes at least one position sensing device, and the spatial reference device is a device that satisfies a preset position condition among the position sensing devices. The spatial reference device can be configured to perform a first communication interaction with a terminal to be located based on a first communication protocol, determine a first relative positioning result for positioning the terminal based on a result of the first communication interaction, and determine a target subspace where the terminal is located based on the first relative positioning result.

It should be noted that the above general description and the following detailed description are merely exemplary and explanatory and should not be construed as limiting of the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure.

DETAILED DESCRIPTION

Figure 1:
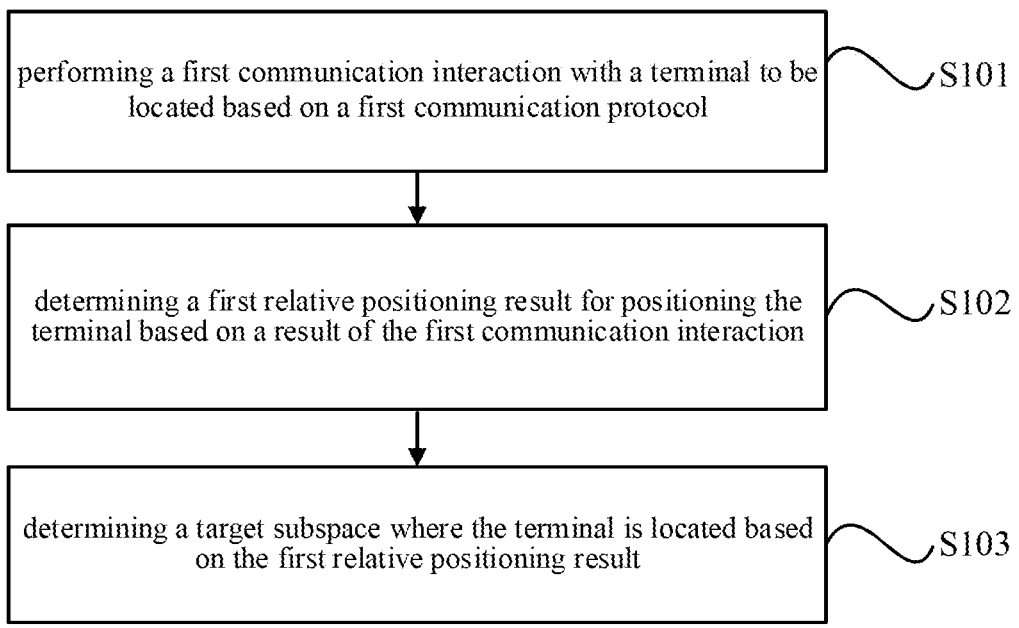
FIG. 1 is a flow chart showing a terminal positioning method according to an exemplary embodiment.

Exemplary embodiments will be described in detail herein, examples of which are shown in the drawings. When referring to the drawings below, unless otherwise indicated, the same numerals in different drawings represent the same or similar elements. The embodiments described in the following exemplary embodiments do not represent all embodiments consistent with the present disclosure. Rather, they are merely examples of apparatuses and methods consistent with some aspects of the present disclosure as detailed in the appended claims.

FIG. 1 is a flowchart of a terminal positioning method according to a first exemplary embodiment. The terminal positioning method may be applied to at least one spatial reference device in a space where a terminal is located.

In this embodiment, the above position sensing device may include a household appliance, a computer office device, or a toy musical instrument device installed with a positioning apparatus and a communication apparatus, which is not limited in this embodiment. The above terminal may include a smart phone, a smart watch, a smart bracelet, a smart earphone or a ring installed with a positioning apparatus and a communication apparatus, which is not limited in this embodiment. In the embodiment, at least two subspaces included in the space where the terminal is located are respectively provided with at least one position sensing device. The spatial reference device is a device that satisfies a preset position condition among the position sensing devices.

As shown in FIG. 1, the terminal positioning method includes following steps S101-S103.

In step S101, a first communication interaction can be performed with a terminal to be located based on a first communication protocol. In this embodiment, at least one spatial reference device in the space where the terminal is located performs the first communication interaction with the terminal to be located based on the first communication protocol. For example, the at least one spatial reference device can perform one-way or two-way multiple information exchange with the terminal. An exchanged content in the information may be a content in an exchange information package preset in the relevant protocol, or may be set by a developer according to actual business requirements, such as ID information of the device, which is not limited in this embodiment.

In an embodiment, the above subspace may be rooms of a house, or may be different areas (e.g., dining area, game area, reading area, and the like.) divided based on rules such as application scenarios. Accordingly, position sensing devices located in these different areas are position sensing devices located in the subspace represented by the corresponding area, which is not limited in this embodiment.

In this embodiment, the first communication protocol may be UWB (Ultra Wideband) protocol. It is worth noting that in addition to the UWB protocol listed above, the first communication protocol may also select other protocols that can achieve positioning based on service needs, such as Bluetooth or Wi-Fi protocol, or the like, which is not limited in the embodiment.

In an embodiment, the device that satisfies a preset position condition among the position sensing devices may include a position sensing device provided at a junction of two subspaces in the space. For example, a local control center (such as a router or other devices) or a cloud server may detect a position sensing device provided at the junction of two subspaces in the space, and then the position sensing device may be determined as the device that satisfies the preset position condition among the position sensing devices in the subspace to which it belongs. On this basis, the local control center (such as a router or other devices) or the cloud server can notify at least one position sensing device in the current space of the determined device that meets the preset location condition.

In an embodiment, the position sensing device provided at the junction of the two subspaces may have other functions besides the positioning function, or it may also be a special positioning device.

In another embodiment, the device that satisfies a preset position condition among the position sensing devices may further include a device that satisfies the preset position condition which is determined in advance based on a position relationship of the position sensing device in each of the at least two subspaces. In this embodiment, the position sensing device in each subspace may perform the communication interaction based on the second communication protocol, to determine the position relationship of the position sensing device in each subspace, and then determine the device that meets the preset position condition based on the position relationship.

In this embodiment, the second communication protocol may include UWB (Ultra Wideband) protocol. It is worth noting that in addition to the UWB protocol listed above, the second communication protocol may also select other protocols that can achieve positioning based on service needs, such as Bluetooth or Wi-Fi protocol, or the like, which is not limited in the embodiment.

For example, a local control center (such as a router or other devices) or a cloud server can obtain the positioning result between the position sensing device in each subspace, and calculate a sum of the distance between each position sensing device and other position sensing devices in the subspace to which it belongs, and then the position sensing device with the smallest sum of the distance can be determined as the device that satisfies the preset position condition among the position sensing devices in the subspace to which it belongs. On this basis, the local control center (such as a router or other devices) or the cloud server can notify at least one position sensing device in the current space of the determined device that meets the preset location condition.

In step S102, a first relative positioning result for positioning the terminal is determined based on a result of the first communication interaction. In this embodiment, after the first communication interaction is performed with the terminal to be located based on the first communication protocol, the spatial reference device may determine the first relative positioning result for positioning the terminal based on the result of the first communication interaction.

In an embodiment, after at least one spatial reference device in the space where the terminal is located performs one-way or two-way multiple information exchange with the terminal to be located based on the first communication protocol, the distance measurement and direction measurement may be performed through physical characteristics of the wireless signals of the information exchange, to obtain the result of distance measurement and direction measurement, i.e., the first relative positioning result.

For example, after at least one spatial reference device in the space where the terminal is located performs one-way or two-way multiple information exchange with the terminal to be located based on the first communication protocol, the flight time of the wireless signals in the information exchange process may be acquired, and then the distance measurement and direction measurement may be performed through methods in the related technologies, such as the TOF distance measurement method and the AOA distance measurement method, etc., to obtain the result of distance measurement and direction measurement, i.e., the first relative positioning result.

In step S103, a target subspace where the terminal is located is determined based on the first relative positioning result. In this embodiment, after a first relative positioning result for positioning the terminal is determined based on a result of the first communication interaction, the spatial reference device may determine a target subspace where the terminal is located based on the first relative positioning result.

For example, if the first relative positioning result obtained by the spatial reference device is "the distance to the terminal is n meters, and the terminal is located in the northeast direction", the first relative positioning result can be compared with the position of each subspace, and thus the target subspace where the terminal is located can be determined based on the comparison result. In addition, the target subspace may be determined by the following manners. For example, when it is determined that the terminal has entered any subspace according to the first relative positioning result, the any subspace may be determined as the target subspace. For another example, a movement trajectory of the terminal may be determined by multiple first relative positioning results, to determine the movement trend of the terminal. When the user is about to enter any subspace, for example, it is determined that the terminal has a tendency to enter any subspace, and the distance from the any subspace is within a preset distance threshold, the any subspace is determined as the target subspace.

It can be known from the above technical solution that in this embodiment, the spatial reference device performs a first communication interaction with a terminal to be located based on a first communication protocol, a first relative positioning result for positioning the terminal is determined based on a result of the first communication interaction, and a target subspace where the terminal is located is determined based on the first relative positioning result, which can accurately determine the target subspace where the terminal is located based on the communication interaction between the spatial reference device and the terminal, meet the user's indoor positioning requirements for the terminal, and then related terminal devices in the target subspace to which it belongs can be controlled based on the positioning result of the terminal. For example, the position sensing device closest to the terminal can be determined according to the distance between the terminal and the position sensing device to wake up nearby, operate nearby, or the like, and it can also lay foundation for subsequent effective management of the terminal.

Figure 2:
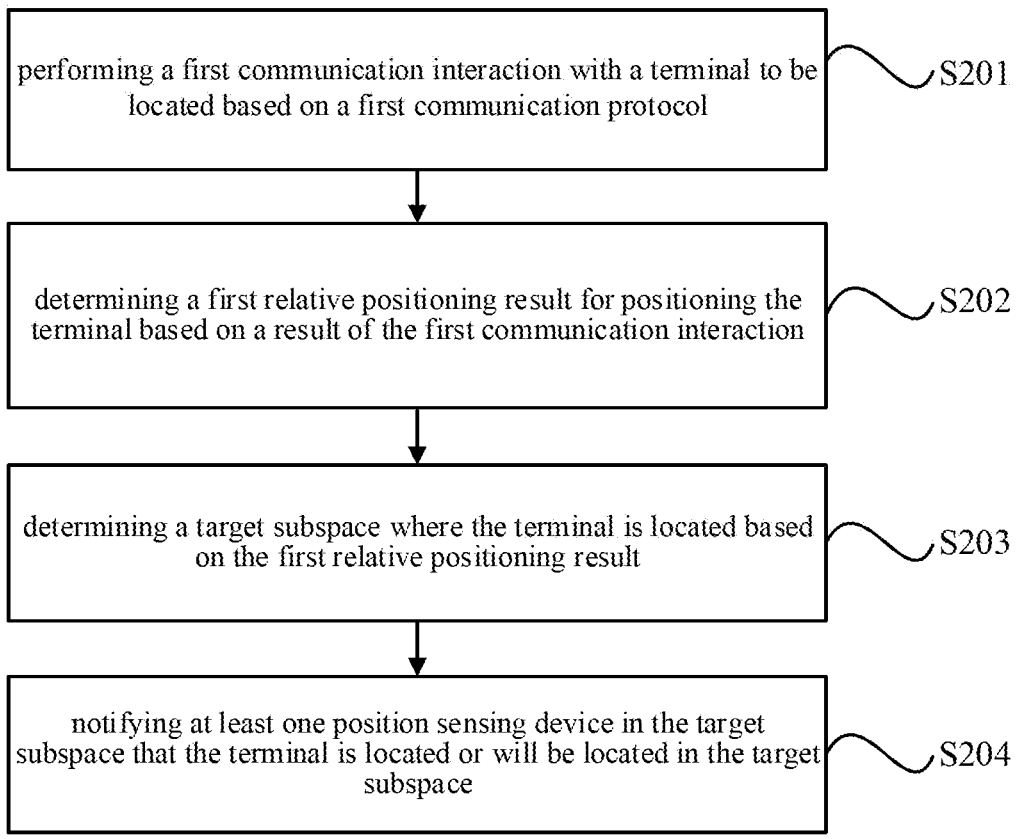
FIG. 2 is a flow chart showing a terminal positioning method according to yet another exemplary embodiment.

FIG. 2 is a flow chart showing a terminal positioning method according to yet another exemplary embodiment. The terminal positioning method may be applied to at least one spatial reference device in a space where a terminal is located.

In this embodiment, the above position sensing device may include a household appliance, a computer office device, or a toy musical instrument device installed with a positioning apparatus and a communication apparatus, which is not limited in this embodiment. The above terminal may include a smart phone, a smart watch, a smart bracelet, a smart earphone or a ring installed with a positioning apparatus and a communication apparatus, which is not limited in this embodiment.

In the embodiment, at least two subspaces included in the space where the terminal is located are respectively provided with at least one position sensing device. The spatial reference device is a device that satisfies a preset position condition among the position sensing devices.

As shown in FIG. 2, the terminal positioning method includes following steps S201-S204. In step S201, a first communication interaction is performed with a terminal to be located based on a first communication protocol. In step 202, a first relative positioning result for positioning the terminal is determined based on a result of the first communication interaction. In step S203, a target subspace where the terminal is located is determined based on the first relative positioning result. For relevant explanations and descriptions of steps S201-S203, reference may be made to the foregoing embodiment, and details are not described herein.

In step S204, at least one position sensing device in the target subspace is notified that the terminal is located or will be located in the target subspace. In this embodiment, after the target subspace in which the terminal is located is determined based on the first relative positioning result, the spatial reference device in the target subspace may notify at least one position sensing device in the target subspace that the terminal is located or will be located in the target subspace. For example, after it is determined that the target subspace where the terminal is located is a master bedroom, the spatial reference device in the master bedroom may notify at least one position sensing device in the master bedroom that the terminal is located in the target subspace.

The notification operation can be performed through a preset protocol and a preset communication process, for example, through the Bluetooth protocol. In an embodiment, in order to save power consumption, as for a position sensing device in a subspace where the terminal is not located, the position sensing device may only enable a low power connection interface, such as a low power Bluetooth interface. When it is determined that the terminal is located in a certain subspace, the position sensing device in the subspace may enable a communication interface for positioning the terminal, such as a UWB communication interface, through the notification operation.

As can be seen from the above description, in this embodiment, at least one position sensing device in the target subspace is notified that the terminal is located or will be located in the target subspace, which is beneficial for at least one position sensing device to communicate with the terminal more accurately, which can better control at least one position sensing device to perform operations such as enabling and shutting with the terminal achieve subsequently, to meet user's management requirements for the terminal.

Figure 3:
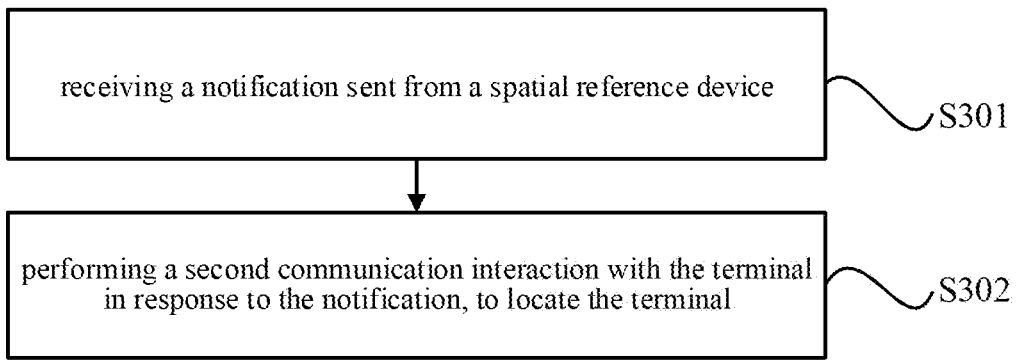
FIG. 3 is a flow chart showing a terminal positioning method according to an exemplary embodiment.

FIG. 3 is a flow chart showing a terminal positioning method according to an exemplary embodiment. The method is applied to at least one position sensing device in a space where a terminal is located, wherein at least two subspaces included in the space where the terminal is located are respectively provided with at least one position sensing device. As shown in FIG. 3, the method includes following steps S301-S302.

In step S301, a notification sent from a spatial reference device is received. In step S302, a second communication interaction is performed with the terminal in response to the notification, to locate the terminal. In this embodiment, after the spatial reference device determines the target subspace where the terminal is located, it can send a notification to the terminal, and then the terminal can receive the notification sent by the spatial reference device. In the embodiment, the spatial reference device is a device that satisfies a preset position condition among the position sensing devices; and the notification is used to notify the position sensing device in a target subspace where the terminal is located. Further, in response to the notification, the position sensing device may perform a second communication interaction with the terminal to locate the terminal.

In one embodiment, in order to save power consumption, when the terminal is not in the subspace where it is located, the communication interface used to locate the terminal may be in a dormant state, and the communication interface may be enabled when the above notification is received. Taking UWB as the communication interface for positioning the terminal as an example, after the UWB communication interface is enabled and before the UWB positioning is performed with the terminal, the UWB communication parameters and encrypted information or the like can also be negotiated with the terminal through Bluetooth, wifi or other communication protocols, and then the UWB positioning operation is performed.

Figure 4:
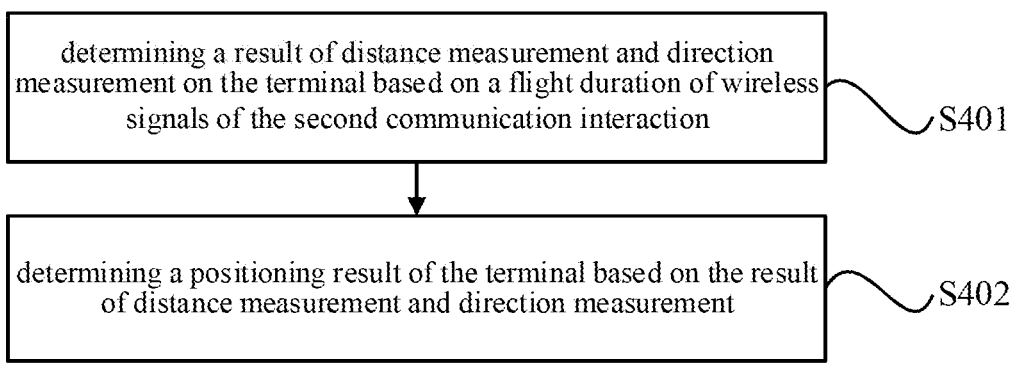
FIG. 4 is a flow chart showing how to perform a second communication interaction with the terminal according to an exemplary embodiment.

FIG. 4 is a flow chart showing how to perform a second communication interaction with the terminal according to an exemplary embodiment. This embodiment is illustrated by using how to perform a second communication interaction with the terminal as an example on the basis of the foregoing embodiment. As shown in FIG. 4, the step S302 of performing a second communication interaction with the terminal to locate the terminal may include following steps S401-S402.

In step S401, a result of distance measurement and direction measurement on the terminal is determined based on a flight duration of wireless signals of the second communication interaction. In this embodiment, the second communication protocol may include UWB (Ultra Wideband) protocol. It is worth noting that in addition to the UWB protocol listed above, the second communication protocol may also select other protocols that can achieve positioning based on service needs, such as Bluetooth or Wi-Fi protocol, or the like, which is not limited in the embodiment.

In this embodiment, a result of distance measurement and direction measurement on the terminal may be determined based on a flight duration of wireless signals of the second communication interaction. For example, after at least one position sensing device in the target subspace performs one-way or two-way multiple information exchange with the terminal based on the second communication protocol, the flight time of the wireless signals in the information exchange process may be acquired, and then the distance measurement and direction measurement may be performed through methods in the related technologies, such as the TOF distance measurement method and the AOA distance measurement method, etc., to obtain the result of distance measurement and direction measurement on the terminal by at least one position sensing device.

In step S402, a positioning result of the terminal is determined based on the result of distance measurement and direction measurement. In this embodiment, after a result of distance measurement and direction measurement on the terminal is determined based on a flight duration of wireless signals of the second communication interaction, a positioning result of the terminal may be determined based on the result of distance measurement and direction measurement.

For example, after at least one position sensing device in the target subspace performs one-way or two-way multiple information exchange with the terminal based on the second communication protocol and obtains the result of distance measurement and direction measurement, the positioning result of the at least one position sensing device on the terminal may be determined based on the result of distance measurement and direction measurement, wherein the positioning result includes a distance between the position sensing device and the terminal, and a direction (e.g., an angle) of the terminal relative to the position sensing device.

It can be seen from the above technical solution that in this embodiment, a result of distance measurement and direction measurement on the terminal is determined based on a flight duration of wireless signals of the second communication interaction, and a positioning result of the terminal is determined based on the result of distance measurement and direction measurement, which may lay foundation for subsequent positioning of the terminal based on at least one position sensing device in the target subspace to better control the terminal to achieve set functions, and which facilitates at least one position sensing device to communicate and interact with the terminal more accurately, and meets the user's management needs for the terminal.

Figure 5:
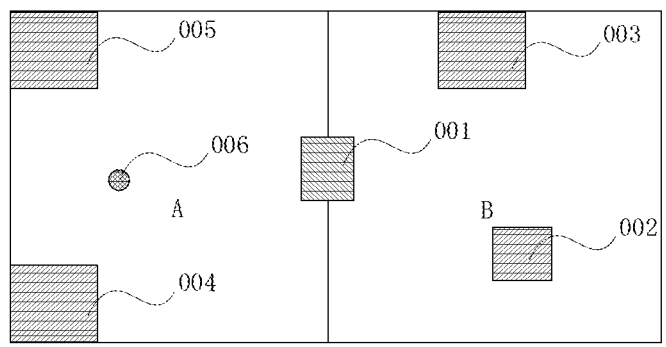
FIG. 5 is a schematic diagram of an application scenario of a terminal positioning method according to an exemplary embodiment.

FIG. 5 is a schematic diagram of an application scenario of a terminal positioning method according to an exemplary embodiment. As shown in FIG. 5, the terminal positioning system includes position sensing devices 001~006 disposed in subspaces A and B. In this embodiment, the position sensing device 001 provided at the junction of subspaces A and B is determined as the spatial reference device, hereinafter referred to as the spatial reference device 001.

As shown in FIG. 5, the spatial reference device 001 performs the first communication interaction with the terminal 006 to be located based on the first communication protocol, and then the first relative positioning result for positioning the terminal 006 is determined based on the wireless signals of the first communication interaction, and then the target subspace (i.e., the subspace A) in which the terminal 006 is located is determined based on the first relative positioning result.

In an embodiment, the spatial reference device 001 may notify at least one position sensing device (i.e., the position sensing device 004 and the position sensing device 005) in the subspace A that the terminal 006 is located in the subspace A. Then the position sensing device 004 and the position sensing device 005 can perform mutual positioning with the terminal 006 to obtain the positioning result of the terminal 006.

Figure 6:
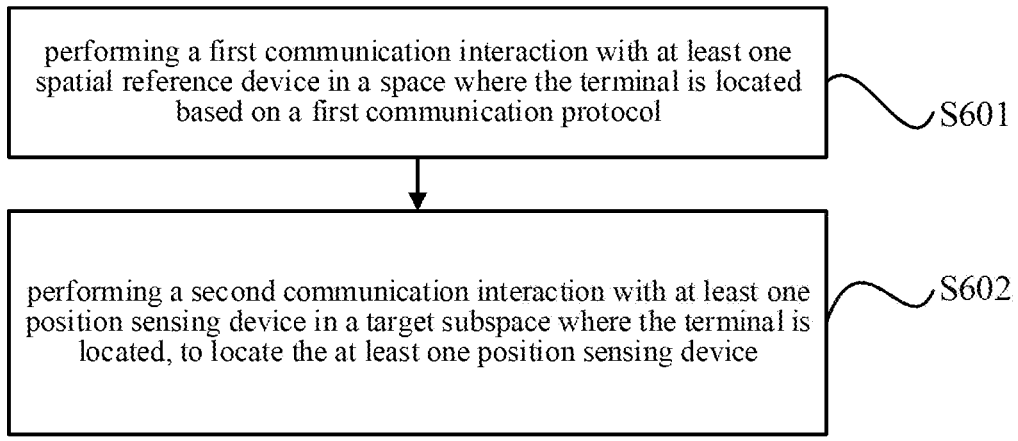
FIG. 6 is a flow chart showing a terminal positioning method according to an exemplary embodiment.

FIG. 6 is a flow chart showing a terminal positioning method according to an exemplary embodiment. This method can be applied to the terminal to be located. As shown in FIG. 6, the method includes following steps S601-S602.

In step S601, a first communication interaction is performed with at least one spatial reference device in a space where the terminal is located based on a first communication protocol. In this embodiment, the above position sensing device may include a household appliance, a computer office device, or a toy musical instrument device installed with a positioning apparatus and a communication apparatus, which is not limited in this embodiment. The above terminal may include a smart phone, a smart watch, a smart bracelet, a smart earphone or a ring installed with a positioning apparatus and a communication apparatus, which is not limited in this embodiment.

In the embodiment, at least two subspaces included in the space where the terminal is located are respectively provided with at least one position sensing device, the spatial reference device is a device that satisfies a preset position condition among the position sensing devices. In this embodiment, the terminal may perform the first communication interaction with at least one spatial reference device in the space where the terminal is located based on the first communication protocol, to obtain the result of the first communication interaction.

In step S602, a second communication interaction is performed with at least one position sensing device in a target subspace where the terminal is located, to locate the at least one position sensing device, wherein the subspace where the terminal is located is acquired by positioning the terminal through the at least one spatial reference device based on a result of the first communication interaction.

In this embodiment, after the terminal performs the first communication interaction with at least one spatial reference device in the space where the terminal is located based on the first communication protocol, the spatial reference device may locate the terminal based on the result of the first communication interaction to obtain the subspace where the terminal is located. On this basis, the terminal may perform the second communication interaction with at least one position sensing device in the target subspace, and locate the at least one position sensing device.

It can be known from the above technical solution that in this embodiment, a first communication interaction is performed with at least one spatial reference device in a space where the terminal is located based on a first communication protocol, and a second communication interaction is performed with at least one position sensing device in a target subspace where the terminal is located, to locate the at least one position sensing device, which may lay foundation for subsequent positioning of the terminal based on at least one position sensing device in the target subspace to better control the terminal to achieve set functions, and which facilitates at least one position sensing device to communicate and interact with the terminal more accurately, and meets the user's management needs for the terminal.

Figure 7:
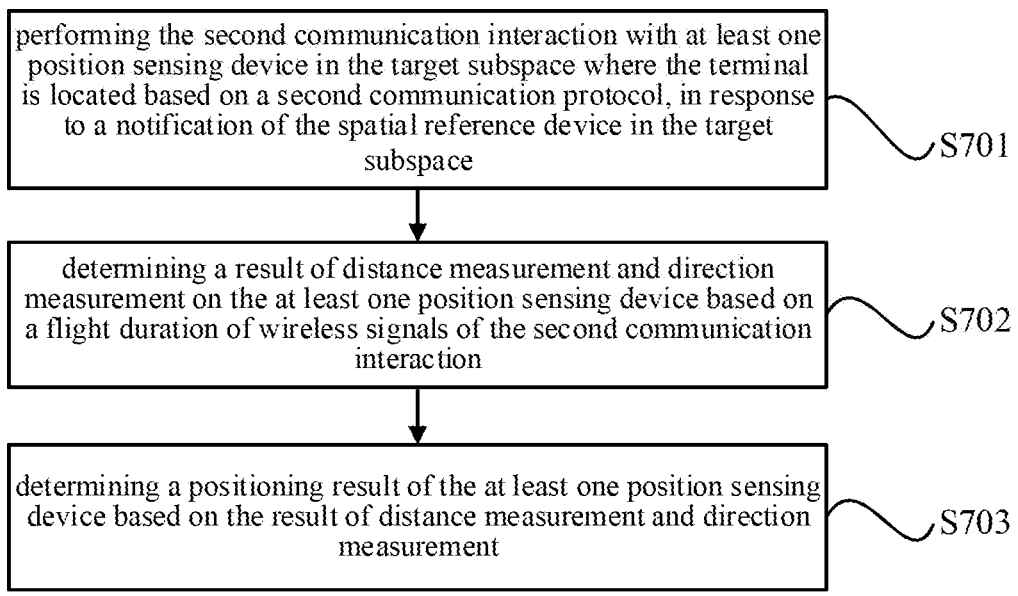
FIG. 7 is a flowchart showing how to perform a second communication interaction with at least one position sensing device in a target subspace according to an exemplary embodiment.

FIG. 7 is a flowchart showing how to perform a second communication interaction with at least one position sensing device in a target subspace according to an exemplary embodiment. On the basis of the foregoing embodiments, this embodiment takes an example to illustrate how to perform the second communication interaction with at least one position sensing device in the target subspace. As shown in FIG. 7, the above step S603 of performing a second communication interaction with at least one position sensing device in a target subspace where the terminal is located may include following steps S701-S703.

In step S701, the second communication interaction is performed with at least one position sensing device in the target subspace where the terminal is located based on a second communication protocol, in response to a notification of the spatial reference device in the target subspace.

In step S702, a result of distance measurement and direction measurement on the at least one position sensing device is determined based on a flight duration of wireless signals of the second communication interaction.

In step S703, a positioning result of the at least one position sensing device is determined based on the result of distance measurement and direction measurement.

In this embodiment, after the spatial reference device determines the target subspace where the terminal is located, it can notify the position sensing device in the target subspace to perform the second communication interaction with the terminal. Then the terminal can perform the second communication interaction with at least one position sensing device in the target subspace based on a second communication protocol, in response to a notification of the spatial reference device in the target subspace; determine a result of distance measurement and direction measurement on the at least one position sensing device based on a flight duration of wireless signals of the second communication interaction; and then may determine a positioning result of the at least one position sensing device based on the result of distance measurement and direction measurement.

For example, after at least one position sensing device in the target subspace performs one-way or two-way multiple information exchange with the terminal based on the second communication protocol and obtains the result of distance measurement and direction measurement, the positioning result of the at least one position sensing device on the terminal may be determined based on the result of distance measurement and direction measurement, wherein the positioning result includes a distance between the position sensing device and the terminal, and a direction (e.g., an angle) of the terminal relative to the position sensing device.

Figure 8:
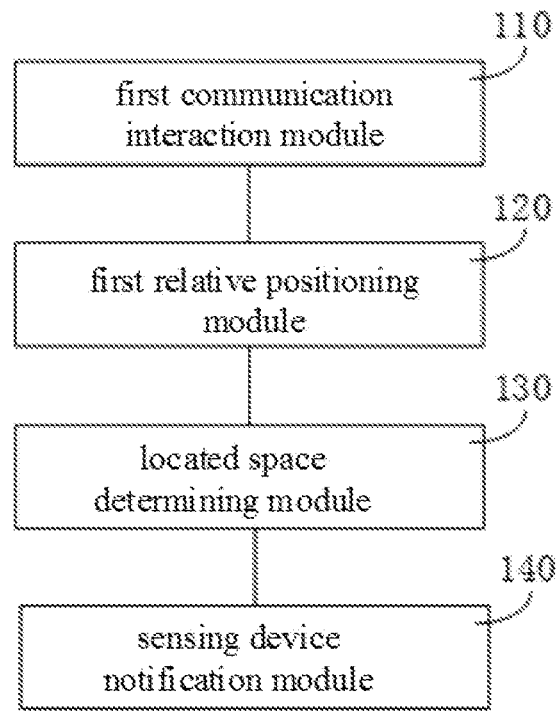
FIG. 8 is a block diagram of a terminal positioning apparatus according to an exemplary embodiment.

FIG. 8 is a block diagram of a terminal positioning apparatus according to an exemplary embodiment. The apparatus is applied to at least one spatial reference device in a space where a terminal is located, wherein at least two subspaces included in the space where the terminal is located are respectively provided with at least one position sensing device, the spatial reference device is a device that satisfies a preset position condition among the position sensing devices. As shown in FIG. 8, the apparatus includes: a first communication interaction module 110, a first relative positioning module 120 and a located space determining module 130.

The first communication interaction module 110 is configured to perform a first communication interaction with a terminal to be located based on a first communication protocol. The first relative positioning module 120 is configured to determine a first relative positioning result for positioning the terminal based on a result of the first communication interaction. The located space determining module 130 is configured to determine a target subspace where the terminal is located based on the first relative positioning result.

In an optional embodiment, the above device that satisfies a preset position condition among the position sensing devices may include a position sensing device provided at a junction of two subspaces in the space. In another optional embodiment, the above device that satisfies a preset position condition among the position sensing devices may include a device that satisfies the preset position condition which is determined in advance based on a position relationship of the position sensing device in each of the at least two subspaces. In an optional embodiment, the apparatus may further include a sensing device notification module 140, configured to notify at least one position sensing device in the target subspace that the terminal is located or will be located in the target subspace.

It can be known from the above technical solution that in this embodiment, the spatial reference device performs a first communication interaction with a terminal to be located based on a first communication protocol, a first relative positioning result for positioning the terminal is determined based on a result of the first communication interaction, and a target subspace where the terminal is located is determined based on the first relative positioning result, which can accurately determine the target subspace where the terminal is located based on the communication interaction between the spatial reference device and the terminal, meet the user's indoor positioning requirements for the terminal, and then related terminal devices in the target subspace to which it belongs can be controlled based on the positioning result of the terminal to open and close or to perform other operations, and it can also lay foundation for subsequent effective management of the terminal.

Figure 9:
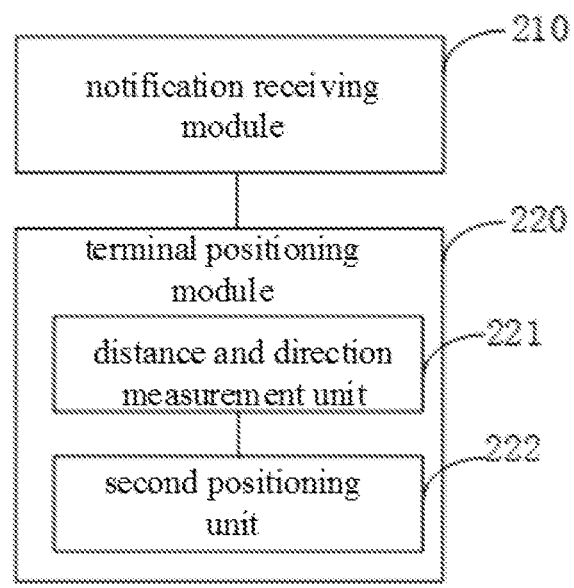
FIG. 9 is a block diagram of a terminal positioning apparatus according to another exemplary embodiment.

FIG. 9 is a block diagram of a terminal positioning apparatus according to another exemplary embodiment. The apparatus is applied to at least one position sensing device in a space where a terminal is located, wherein at least two subspaces included in the space where the terminal is located are respectively provided with at least one position sensing device. As shown in FIG. 9, and the apparatus may include: a notification receiving module 210 and a terminal positioning module 220.

The notification receiving module 210 is configured to receive a notification sent from a spatial reference device. The spatial reference device is a device that satisfies a preset position condition among the position sensing devices and the notification is used to notify the position sensing device in a target subspace where the terminal is located. The terminal positioning module 220 is configured to perform a second communication interaction with the terminal in response to the notification, to locate the terminal.

In an optional embodiment, the terminal positioning module 220 may include a distance and direction measurement unit 221, configured to determine a result of distance measurement and direction measurement on the terminal based on a flight duration of wireless signals of the second communication interaction, and a second positioning unit 222, configured to determine a positioning result of the terminal based on the result of distance measurement and direction measurement.

It can be known from the above technical solution that in this embodiment, by receiving the notification sent by the spatial reference device, and performing a second communication interaction with the terminal in response to the notification to locate the terminal, it may lay foundation for better controlling the terminal based on the positioning result subsequently, and is conducive to at least one position sensing device to communicate and interact with the terminal more accurately, which can meet the user's management requirements for the terminal.

Figure 10:
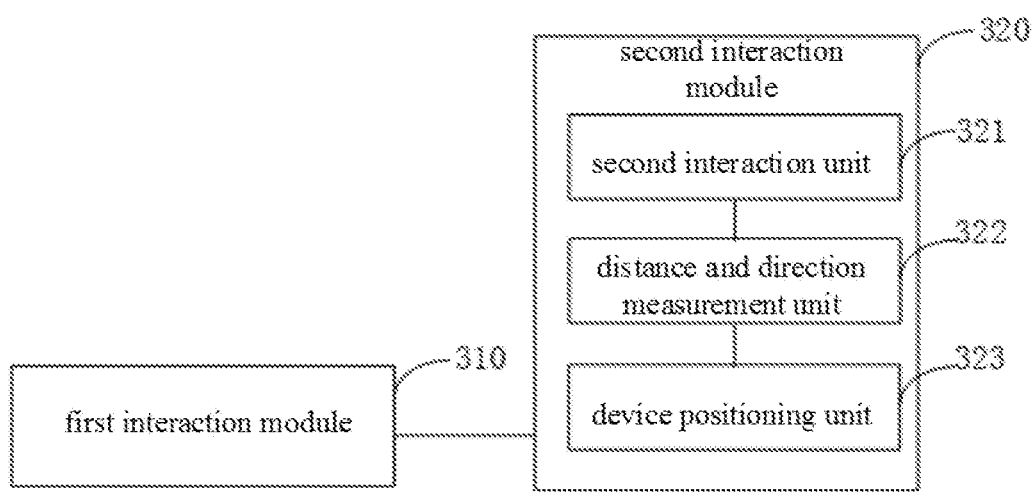
FIG. 10 is a block diagram of a terminal positioning apparatus according to another exemplary embodiment.

FIG. 10 is a block diagram of a terminal positioning apparatus according to another exemplary embodiment. The apparatus is applied to a terminal to be located. As shown in FIG. 10, the apparatus may include: a first interaction module 310 and a second interaction module 320.

The first interaction module 310 is configured to perform a first communication interaction with at least one spatial reference device in a space where the terminal is located based on a first communication protocol, wherein at least two subspaces included in the space where the terminal is located are respectively provided with at least one position sensing device, the spatial reference device is a device that satisfies a preset position condition among the at least one position sensing device.

The second interaction module 320 is configured to perform a second communication interaction with at least one position sensing device in a target subspace where the terminal is located, to locate the at least one position sensing device, wherein the subspace where the terminal is located is acquired by positioning the terminal through the at least one spatial reference device based on a result of the first communication interaction.

In an optional embodiment, the second interaction module 320 may include a second interaction unit 321 that is configured to perform the second communication interaction with at least one position sensing device in the target subspace where the terminal is located based on a second communication protocol, in response to a notification of the spatial reference device in the target subspace, and a distance and direction measurement unit 322 that is configured to determine a result of distance measurement and direction measurement on the at least one position sensing device based on a flight duration of wireless signals of the second communication interaction. Further, it may include a device positioning unit 323 that is configured to determine a positioning result of the at least one position sensing device based on the result of distance measurement and direction measurement.

Regarding the apparatus in the above embodiment, the specific manner in which each module performs operations has been described in detail in the embodiment related to the method, and will not be elaborated herein.

On the other hand, the present disclosure further provides a terminal positioning system, including a terminal, at least one position sensing device and at least one spatial reference device, wherein a space where the terminal is located includes at least two subspaces, each subspace includes at least one position sensing device. The spatial reference device is a device that satisfies a preset position condition among the position sensing devices. The spatial reference device can be configured to perform a first communication interaction with a terminal to be located based on a first communication protocol, determine a first relative positioning result for positioning the terminal based on a result of the first communication interaction, and determine a target subspace where the terminal is located based on the first relative positioning result.

The technical solutions provided by embodiments of the present disclosure may include beneficial effects. For example, in the present disclosure, the spatial reference device performs a first communication interaction with a terminal to be located based on a first communication protocol, a first relative positioning result for positioning the terminal is determined based on a result of the first communication interaction, and a target subspace where the terminal is located is determined based on the first relative positioning result, which can accurately determine the target subspace where the terminal is located based on the communication interaction between the spatial reference device and the terminal, meet the user's indoor positioning requirements for the terminal, and then lay foundation for subsequent effective management of the terminal.

Figure 11:
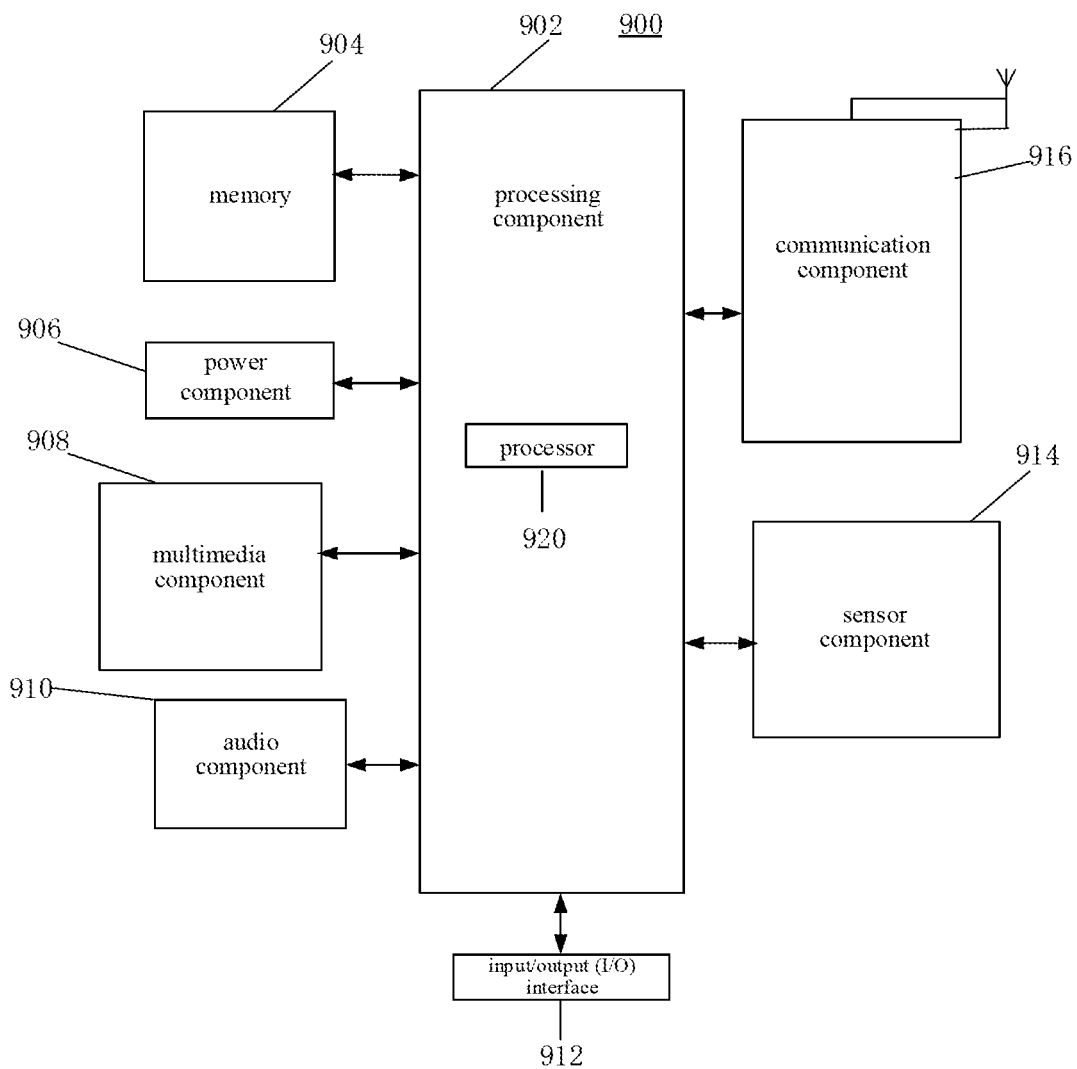
FIG. 11 is a block diagram of an electronic device according to an exemplary embodiment.

FIG. 11 is a block diagram showing an electronic device according to an exemplary embodiment. For example, the device 900 may be a mobile phone, computer, digital broadcasting terminal, messaging device, game console, tablet device, medical device, fitness device, personal digital assistant, and the like, which may be the terminal, the spatial reference device or the position sensing device in the embodiments of the present disclosure.

Referring to FIG. 11, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the device 900, such as the operations associated with display, telephone calls, data communications, camera operations, and recording operations. The processing component 902 can include one or more processors 920 to execute instructions to perform all or part of the steps in the above described methods. Moreover, the processing component 902 can include one or more modules to facilitate the interaction between the processing component 902 and other components. For example, the processing component 902 can include a multimedia module to facilitate the interaction between the multimedia component 908 and the processing component 902.

The memory 904 is configured to store various types of data to support the operation of the device 900. Examples of such data include instructions for any application or method operated on the device 900, such as the contact data, the phone book data, messages, pictures, videos, and the like. The memory 904 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 can include a power management system, one or more power sources, and other components associated with the generation, management, and distribution of power in the device 900.

The multimedia component 908 includes a screen providing an output interface between the device 900 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. When the device 900 is in an operation mode, such as a photographing mode or a video mode, the front camera and/or the rear camera can receive external multimedia datum. Each of the front camera and the rear camera may be a fixed optical lens system or have focus and optical zoom capability.

The audio component 910 is configured to output and/or input an audio signal. For example, the audio component 910 includes a microphone (MIC) configured to receive an external audio signal when the device 900 is in an operation mode, such as a call mode, a recording mode, and a voice recognition mode. The received audio signal may be further stored in the memory 904 or sent via the communication component 916. In some embodiments, the audio component 910 also includes a speaker for outputting the audio signal.

The I/O interface 912 provides an interface between the processing component 902 and peripheral interface modules, such as a keyboard, a click wheel, buttons, and the like. These buttons may include, but are not limited to, a home button, a volume button, a starting button, and a locking button.

The sensor component 914 includes one or more sensors for providing status assessments of various aspects of the device 900. For example, the sensor component 914 can detect an open/closed status of the device 900, relative positioning of components, such as the display and the keypad of the device 900. The sensor component 914 can also detect a change in position of one component of the device 900 or the device 900, the presence or absence of user contact with the device 900, an orientation, or an acceleration/deceleration of the device 900, and a change in temperature of the device 900. The sensor component 914 can also include a proximity sensor configured to detect the presence of nearby objects without any physical contact. The sensor component 914 can also include a light sensor, such as a CMOS or CCD image sensor, configured to use in imaging applications. In some embodiments, the sensor component 914 can also include an accelerometer sensor, a gyroscope sensor, a magnetic sensor, a pressure sensor, or a temperature sensor.

The communication component 916 is configured to facilitate wired or wireless communication between the device 900 and other devices. The device 900 can access a wireless network based on any communication standard, such as Wi-Fi, 2G, 3G, 4G, 5G, or a combination thereof. In an exemplary embodiment, the communication component 916 receives broadcast signals or broadcast associated information from an external broadcast management system via a broadcast channel. In an exemplary embodiment, the communication component 916 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology, and other technologies.

In an exemplary embodiment, the device 900 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, to perform the terminal positioning methods described above.

In an exemplary embodiment, there is also provided a non-transitory computer-readable storage medium including instructions, such as a memory 904 including instructions executable by the processor 920 of the device 900 to perform the terminal positioning methods described method. For example, the non-transitory computer readable storage medium may be a ROM, a random access memory (RAM), a CD-ROM, a magnetic tape, a floppy disc, and an optical data storage device, or the like.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative only, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A terminal positioning method that is applied a spatial reference device in a space where a terminal is located, at least two subspaces included in the space are respectively provided with at least one position sensing device, and the spatial reference device is a device that satisfies a preset position condition with respect to the at least two subspaces, the method comprising:
performing a first communication interaction with the terminal based on a first communication protocol;
determining a first relative positioning result for positioning the terminal based on a result of the first communication interaction; and
determining a target subspace where the terminal is located among the at least two subspaces based on the first relative positioning result.

2. The method according to claim 1, wherein the preset position condition comprises:
a position at a junction of the at least two subspaces in the space.

3. The method according to claim 1, wherein the preset position condition comprises:
   a position determined based on a position relationship of the respective position sensing devices in the at least two subspaces.

4. The method according to claim 1, wherein the method further comprises:
   notifying the at least one position sensing device in the target subspace that the terminal is located in the target subspace.

5. A terminal positioning method that is applied to a particular position sensing device in a particular subspace in a space where a terminal is located, at least two subspaces included in the space where the terminal is located are respectively provided with at least one position sensing device, the method comprising:
   receiving a notification sent from a spatial reference device that is a device that satisfies a preset position condition with respect to the at least two subspaces, the notification being used to notify the particular position sensing device that the terminal is determined to be located in the particular subspace among the at least two subspaces; and
   performing a second communication interaction with the terminal in response to the notification in order to locate the terminal.

6. The method according to claim 5, wherein the performing the second communication interaction with the terminal in order to locate the terminal further comprises:
   determining a result of distance measurement and direction measurement on the terminal based on a flight duration of wireless signals of the second communication interaction; and
   determining a positioning result of the terminal based on the result of distance measurement and direction measurement.

7. A terminal positioning method that is applied to a terminal, the method comprising:
   performing a first communication interaction with a spatial reference device in a space where the terminal is located based on a first communication protocol, at least two subspaces included in the space where the terminal is located are respectively provided with at least one position sensing device, and the spatial reference device is a device that satisfies a preset position condition with respect to the at least two subspaces; and
   performing a second communication interaction with the at least one position sensing device in a target subspace where the terminal is located among the at least two subspaces in order to locate the terminal by the at least one position sensing device in the target subspace, wherein the target subspace where the terminal is located is determined by the spatial reference device based on a result of the first communication interaction.

8. The method according to claim 7, wherein the performing the second communication interaction with the at least one position sensing device in the target subspace comprises:
   performing the second communication interaction with the at least one position sensing device in the target subspace based on a second communication protocol, in response to a notification from the spatial reference device indicating that the terminal is determined to be in the target subspace;
   determining a result of distance measurement and direction measurement on the at least one position sensing device in the target subspace based on a flight duration of wireless signals of the second communication interaction; and
   determining a positioning result of the at least one position sensing device in the target subspace with respect to the terminal based on the result of distance measurement and direction measurement.

9. A terminal positioning apparatus that is applied to a spatial reference device in a space where a terminal is located, at least two subspaces included in the space where the terminal is located are respectively provided with at least one position sensing device, and the spatial reference device is a device that satisfies a preset position condition with respect to at least two subspaces, the apparatus comprising:
   a processor; and
   a memory for storing instructions executable by the processor,
   wherein the processor is configured to perform the method according to claim 1.

10. The apparatus according to claim 9, wherein the preset position condition comprises:
    a position at a junction of the at least two subspaces in the space.

11. The apparatus according to claim 9, wherein the preset position condition comprises:
    a position determined based on a position relationship of the respective position sensing devices in the at least two subspaces.

12. The apparatus according to claim 9, wherein the processor is further configured to:
    notify the at least one position sensing device in the target subspace that the terminal is located in the target subspace.

13. A terminal positioning apparatus that is applied to a particular position sensing device in a space where a terminal is located, and at least two subspaces included in the space where the terminal is located are respectively provided with at least one position sensing device, the apparatus comprising:
    a processor; and
    a memory for storing instructions executable by the processor,
    wherein the processor is configured to perform the method according to claim 5.

14. The apparatus according to claim 13, wherein the processor is further configured to:
    determine a result of distance measurement and direction measurement on the terminal based on a flight duration of wireless signals of the second communication interaction; and
    determine a positioning result of the terminal based on the result of distance measurement and direction measurement.

15. A terminal comprising:
    a processor; and
    a memory for storing instructions executable by the processor,
    wherein the processor is configured to perform the method according to claim 7.

16. The terminal according to claim 15, wherein the processor is further configured to:
    perform the second communication interaction with the at least one position sensing device in the target subspace based on a second communication protocol, in response to a notification from the spatial reference device indicating that the terminal is determined to be in the target subspace;

determine a result of distance measurement and direction measurement on the at least one position sensing device in the target subspace based on a flight duration of wireless signals of the second communication interaction; and determine a positioning result of the at least one position sensing device in the target subspace with respect to the terminal based on the result of distance measurement and direction measurement.

17. A computer-readable storage medium, having a computer program stored thereon, wherein the computer program is configured to implement the terminal positioning method according to claim 1 when executed by a processor.

18. A terminal positioning system, comprising a terminal, position sensing devices, and a spatial reference device that is a device that satisfies a preset position condition with respect to at least two subspaces, wherein a space where the terminal is located includes the at least two subspaces, with each subspace having at least one position sensing device of the position sensing devices, wherein the spatial reference device is configured to perform the method according to claim 1.

19. A computer-readable storage medium, having a computer program stored thereon, wherein the computer program is configured to implement the terminal positioning method according to claim 5 when executed by a processor.

20. A computer-readable storage medium, having a computer program stored thereon, wherein the computer program is configured to implement the terminal positioning method according to claim 7 when executed by a processor.

* * * * *